(12) United States Patent
Shurtleff et al.

(10) Patent No.: US 8,296,171 B2
(45) Date of Patent: Oct. 23, 2012

(54) USER INTERFACE FOR HUMAN INVOLVED BUSINESS PROCESSES

(75) Inventors: Mark S. Shurtleff, Oakland, CA (US);
Avinash Dabholkar, Fremont, CA (US);
Sowmya Ramani, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 889 days.

(21) Appl. No.: 11/851,456

(22) Filed: Sep. 7, 2007

(65) Prior Publication Data
US 2009/0070698 A1 Mar. 12, 2009

(51) Int. Cl.
*G06Q 10/00* (2006.01)
*G06F 3/00* (2006.01)

(52) U.S. Cl. ............... 705/7.21; 705/7.13; 705/7.15; 705/7.26; 715/739; 715/751

(58) Field of Classification Search ............ None
See application file for complete search history.

(56) References Cited

U.S. PATENT DOCUMENTS

| | | | |
|---|---|---|---|
| 7,818,714 B2* | 10/2010 | Ryan et al. | 717/104 |
| 2005/0240561 A1* | 10/2005 | Jain et al. | 707/1 |
| 2006/0074734 A1* | 4/2006 | Shukla et al. | 705/8 |
| 2006/0085790 A1* | 4/2006 | Hintermeister et al. | 718/100 |
| 2006/0190391 A1* | 8/2006 | Cullen et al. | 705/37 |
| 2006/0195330 A1* | 8/2006 | Bogner et al. | 705/1 |
| 2007/0099157 A1* | 5/2007 | Lowry | 434/107 |
| 2007/0150327 A1* | 6/2007 | Dromgold | 705/8 |
| 2007/0208606 A1* | 9/2007 | Mackay et al. | 705/9 |
| 2007/0244910 A1* | 10/2007 | Mital et al. | 707/100 |
| 2007/0276714 A1* | 11/2007 | Beringer | 705/7 |
| 2008/0040140 A1* | 2/2008 | Aleong et al. | 705/1 |
| 2008/0077530 A1* | 3/2008 | Banas et al. | 705/50 |
| 2008/0114628 A1* | 5/2008 | Johnson et al. | 705/7 |
| 2008/0301296 A1* | 12/2008 | York | 709/225 |

OTHER PUBLICATIONS

Smith et al. "Workflow is just a Pi process" (Nov. 2003) Computer Sciences Corporation.*
"IDS Document Management and Workflow Project Assessment Methodology" (2007) Integrated Digital Systems, ScanAmerica, Inc.*

* cited by examiner

*Primary Examiner* — Lynda Jasmin
*Assistant Examiner* — Sujay Koneru
(74) *Attorney, Agent, or Firm* — Kilpatrick Townsend & Stockton LLP

(57) ABSTRACT

Embodiments of the invention provide systems and methods for providing a graphical representation of a business process. According to one embodiment, a method for providing a user-relevant view of a business process can comprise reading a definition of the business process. A determination can be made as to whether a milestone in the business process is relevant to an end user of the business process based on a set of pre-defined milestones for the business process. In response to determining the milestone in the business process is relevant to the end user a visualization of the business process can be generated that includes the milestone. In response to determining the milestone in the business process is not relevant to the end user, a visualization of the business process can be generated that does not include the milestone.

16 Claims, 10 Drawing Sheets

FIG. 7

USER INTERFACE FOR HUMAN INVOLVED BUSINESS PROCESSES

BACKGROUND OF THE INVENTION

Embodiments of the present invention relate generally to methods and systems for providing a graphical representation of a business process and more particularly to providing a user-relevant view of a human-involved business process.

A business process can be defined as a sequence or sequences of activities that achieve a final state. That is, a business process, defined in any of a variety of known business process definition languages, can define tasks to be performed at various points in time, upon the occurrence of some event or condition, upon request, or based on another criteria. For example, in a human resources management context, a business process may define tasks to be performed when "on-boarding" a new employee or upon the termination of an existing employee. In another context, business processes can be defined for ordering supplies, generating work orders, filling work orders, or any other process to be performed in the conduct of the business. These processes can involve both completely automated processes as well as processes that involve and/or require human interaction.

In some cases, these business processes or, more specifically, the definition of the business processes, can be viewed in a graphical form. For example, frameworks exist for reading a definition of a business process and rendering a representation of that process in a graphical form via a web-based interface. However, current web-based UI frameworks do not provide visibility to business processes in a manner that is contextually relevant to the user. For example, these frameworks do not provide a graphical view of all the tasks components within a business process, do not allow the user to maintain context when viewing a business process, and do not display activities of multiple human task "owners". Hence, there is a need for improved methods and systems for providing a user-relevant view of a business process.

BRIEF SUMMARY OF THE INVENTION

Embodiments of the invention provide systems and methods for providing a graphical representation of a business process. According to one embodiment, a method for providing a user-relevant view of a business process can comprise reading a definition of the business process. For example, a business process may be defined in Business Process Execution Language (BPEL) or another business process definition language. A determination can be made as to whether a milestone in the business process is relevant to an end user of the business process based on a set of pre-defined milestones for the business process. In response to determining the milestone in the business process is relevant to the end user a visualization of the business process, such as a web page for example, can be generated that includes the milestone. In response to determining the milestone in the business process is not relevant to the end user, a visualization of the business process can be generated that does not include the milestone.

Once generated, the visualization of the business process can then be rendered. After rendering, an input can be received from the end-user indicating a status for the milestone. A status of the business process can be updated based on the status for the milestone. Furthermore, the visualization of the business process can be updated based on the status for the milestone and the visualization of the business process can be re-rendered.

Each milestone can comprise a collection of one or more tasks associated with the milestone. Furthermore, the milestones can comprise one or more ordered sub-milestones. The one or more ordered milestones can be defined as those that require completion prior to performing a task associated with a subsequent milestone. In such cases, generating the visualization of the business process can comprise generating a visualization of the ordered milestones in a linear arrangement. Additionally or alternatively, the milestones can comprise one or more non-ordered milestones. The one or more non-ordered milestones can be defined as those that do not require completion prior to performing a task associated with a subsequent milestone. In such a case, generating the visualization of the business process can comprise generating a visualization of the non-ordered milestones in a checklist user interface.

In some cases, at least one of the milestones can comprise one or more sub-milestones. In such a case, each sub-milestone can comprise a collection of one or more tasks associated with the sub-milestone. The one or more sub-milestones can comprise one or more ordered sub-milestones. The one or more ordered sub-milestones can be defined as those sub-milestones that require completion prior to performing a task associated with a subsequent sub-milestone. Additionally or alternatively, the one or more sub-milestones comprise one or more non-ordered tasks. The one or more non-ordered sub-milestones can be defined as those sub-milestones that do not require completion prior to performing a task associated with a subsequent sub-milestone.

According to another embodiment, a machine-readable medium can have stored thereon a series of instructions which, when executed by a processor, cause the processor to provide a user-relevant view of a business process by reading a definition of the business process. A determination can be made as to whether a milestone in the business process is relevant to an end user of the business process based on a set of pre-defined milestones for the business process. In response to determining the milestone in the business process is relevant to the end user a visualization of the business process can be generated that includes the milestone. In response to determining the milestone in the business process is not relevant to the end user, a visualization of the business process can be generated that does not include the milestone.

Once generated, the visualization of the business process can then be rendered. After rendering, an input can be received from the end-user indicating a status for the milestone. A status of the business process can be updated based on the status for the milestone. Furthermore, the visualization of the business process can be updated based on the status for the milestone and the visualization of the business process can be re-rendered.

Each milestone can comprise a collection of one or more tasks associated with the milestone. Furthermore, the milestones can comprise one or more ordered milestones. The one or more ordered milestones can be defined as those that require completion prior to performing a task associated with a subsequent milestone. In such cases, generating the visualization of the business process can comprise generating a visualization of the ordered milestones in a linear arrangement. Additionally or alternatively. the milestones can comprise one or more non-ordered milestones. The one or more non-ordered milestones can be defined as those that do not require completion prior to performing a task associated with a subsequent milestone. In such a case, generating the visualization of the business process can comprise generating a visualization of the non-ordered milestones.

In some cases, at least one of the milestones can comprise one or more sub-milestones. In such a case, each sub-milestone can comprise a collection of one or more tasks associated with the sub-milestone. The one or more sub-milestones can comprise one or more ordered sub-milestones. The one or more ordered sub-milestones can be defined as those sub-milestones that require completion prior to performing a task associated with a subsequent sub-milestone. Additionally or alternatively, the one or more sub-milestones comprise one or more non-ordered sub-milestones. The one or more non-ordered sub-milestones can be defined as those sub-milestones that do not require completion prior to performing a task associated with a subsequent sub-milestone.

According to yet another embodiment, a system can comprise a processor and a memory communicatively coupled with and readable by the processor. The memory can have stored therein a business process, a set of pre-defined milestones for the business process, and a series of instructions. When executed by the processor, the instruction can cause the processor to read the definition of the business process, determine whether a milestone in the business process is relevant to an end user of the business process based on the set of pre-defined milestones for the business process, in response to determining the milestone in the business process is relevant to the end user, generate a visualization of the business process that includes the milestone, and in response to determining the milestone in the business process is not relevant to the end user, generate a visualization of the business process that does not include the milestone.

The system can also include an output device communicatively coupled with the processor. The instructions can further cause the processor to render the visualization of the business process on the output device. The system can also comprise an input device communicatively coupled with the processor. The instructions can further cause the processor to receive input from the end-user indicating a status for the milestone and update a status of the business process based on the status for the milestone. Furthermore, the instruction can cause the processor to update the visualization of the business process based on the status for the milestone and re-render the visualization of the business process on the output device.

BRIEF DESCRIPTION OF THE DRAWINGS

FIG. 7 is a screenshot of an exemplary user interface for displaying a user-relevant view of a business process including milestones and sub-milestones according to one embodiment of the present invention.

DETAILED DESCRIPTION OF THE INVENTION

Figure 1:
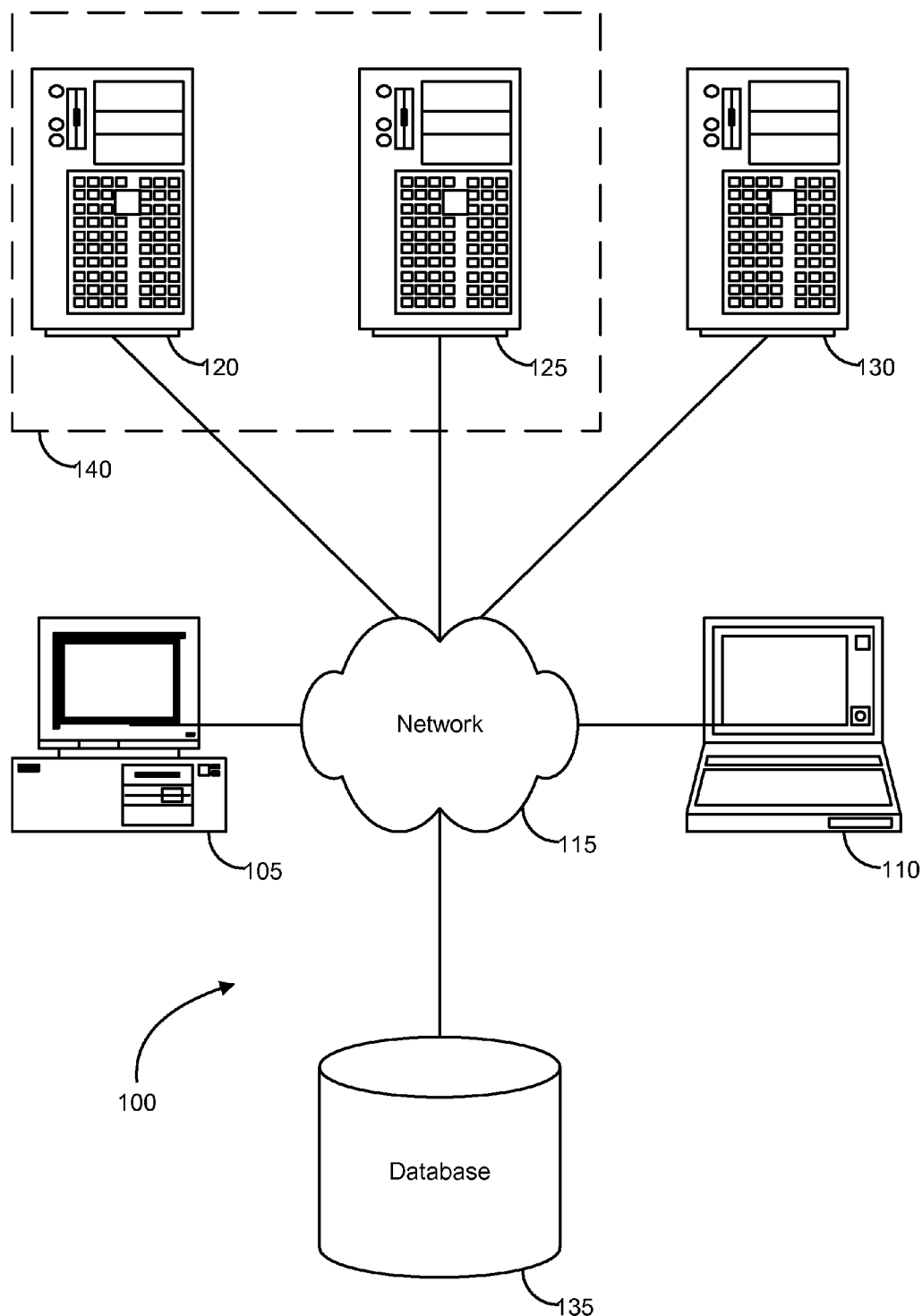
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process can terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing a view of a business process to a user that is contextually relevant to that user. According to one embodiment and as will be described in detail below, providing a user-relevant view of a business process can comprise reading a definition of the business process. For example, a business process can be defined in Business Process Execution language (BPEL) or another known business process definition language. For each or any milestone in the business process definition, a determination can be made as to whether that milestone is relevant to an end user of the business process. This determination can be based on a set of pre-defined milestones for the business process. For example, the pre-defined milestones may be defined in an "activity guide", e.g., a metadata file, defining the milestones in that process that are relevant to a particular user or set of users. In response to determining the milestone in the business process is relevant to the end user, a visualization of the business process, for example a web page graphically depicting the process, can be generated that includes the milestone. In response to determining the milestone in the business process is not relevant to the end user, a visualization of the business process can be generated that does not include the milestone. This visualization can then be rendered, for example, via a web browser.

After rendering the visualization of the business process, an input can be received from the end-user indicating a status for the milestone. For example, the completion of the human-involved task by the user can signal the completion of the milestone. A status of the business process can be updated based on the status of the milestones in the business process. Furthermore, the visualization of the business process can be updated based on the status for the milestone and the visualization of the business process can be re-rendered. Additional details of various embodiments of the present invention will be described below with reference to FIGS. 1-11.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3 G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125,

130, and/or in communication (e.g. via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
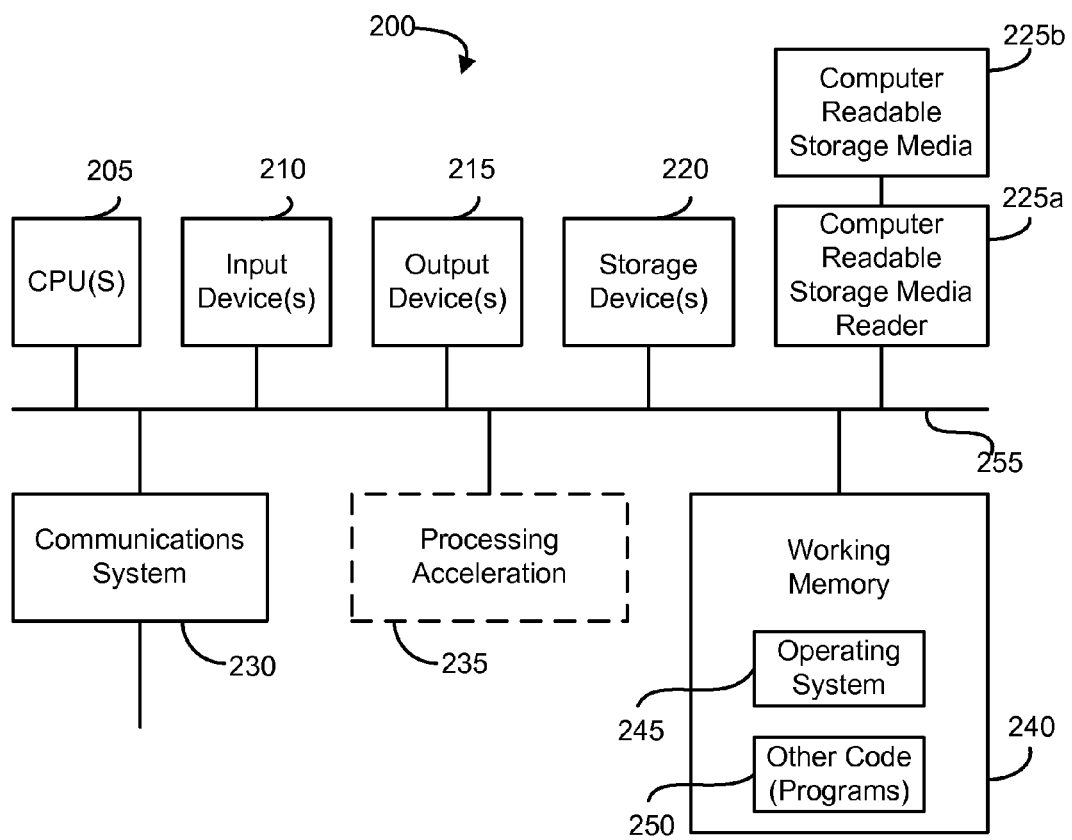
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
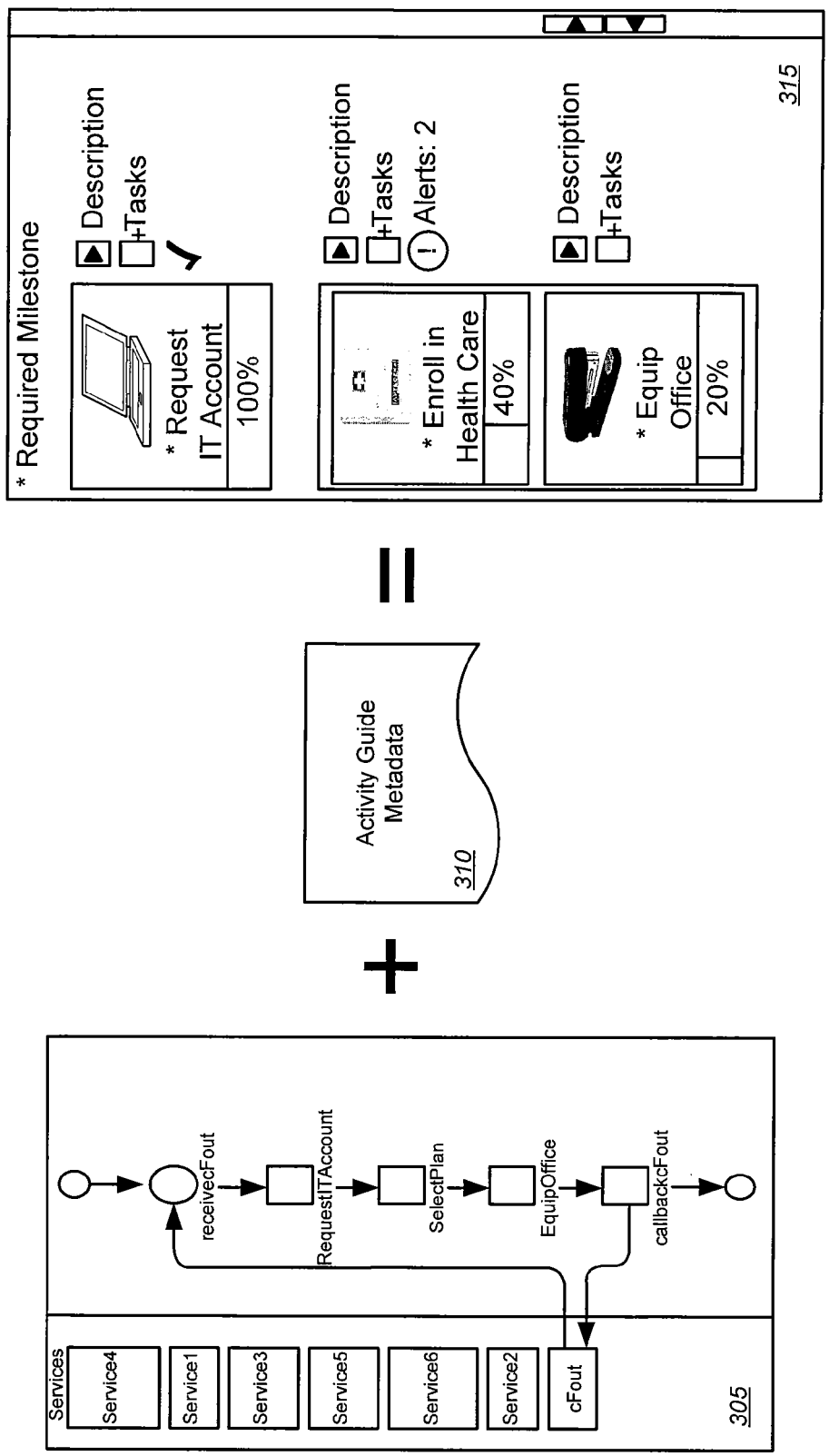
FIG. 3 is a block diagram illustrating, conceptually, a process for providing a user-relevant view of a business process according to one embodiment of the present invention.

FIG. 3 is a block diagram illustrating, conceptually, a process for providing a user-relevant view of a business process according to one embodiment of the present invention. In this example, a business process definition or process model 305 can be defined in BPEL or another business process definition language. As shown here for illustrative purposes only, the process model 305 is rendered in a graphical form representing the tasks and conditional statements comprising the business process definition. However, such rendering is not required for purposes of the present invention.

Generally speaking and as will be described in greater detail below, providing a user-relevant view of process model 305 can comprise reading the definition of the business process, i.e., the process model 305. For each or any milestone in the process model 305, a determination can be made as to whether that milestone is relevant to an end user of the business process. This determination can be based on a set of pre-defined milestones for the business process defined in the activity guide metadata file 310. Generally speaking, the activity guide metadata file 310 can identify a set of one or more tasks within the process model 305 associated with the milestone and define, for example, whether that set of tasks is ordered, i.e., must be completed before performing tasks of another milestone, or non-ordered, i.e., need not be completed before performing tasks of another milestone. The activity guide metadata 310 can also define, for example, sub-milestones for any given milestone. Furthermore, the sub-milestones may be defined as ordered or unordered. Additional details of the activity guide metadata file 310 will be described below with reference to FIG. 4.

In response to determining the milestone in the process model 305 is relevant to the end user, a visualization 315 of the business process, for example a web page graphically depicting the process, can be generated that includes the milestone. In response to determining the milestone in the process model 305 is not relevant to the end user, a visualization of the business process can be generated that does not include the milestone. This visualization 315 can then be rendered, for example, via a web browser. Additional details of the visualization 315, the rendering thereof, and exemplary user interface in which the visualization 315 may be rendered arte described below with reference to FIGS. 7-12.

Figure 4:
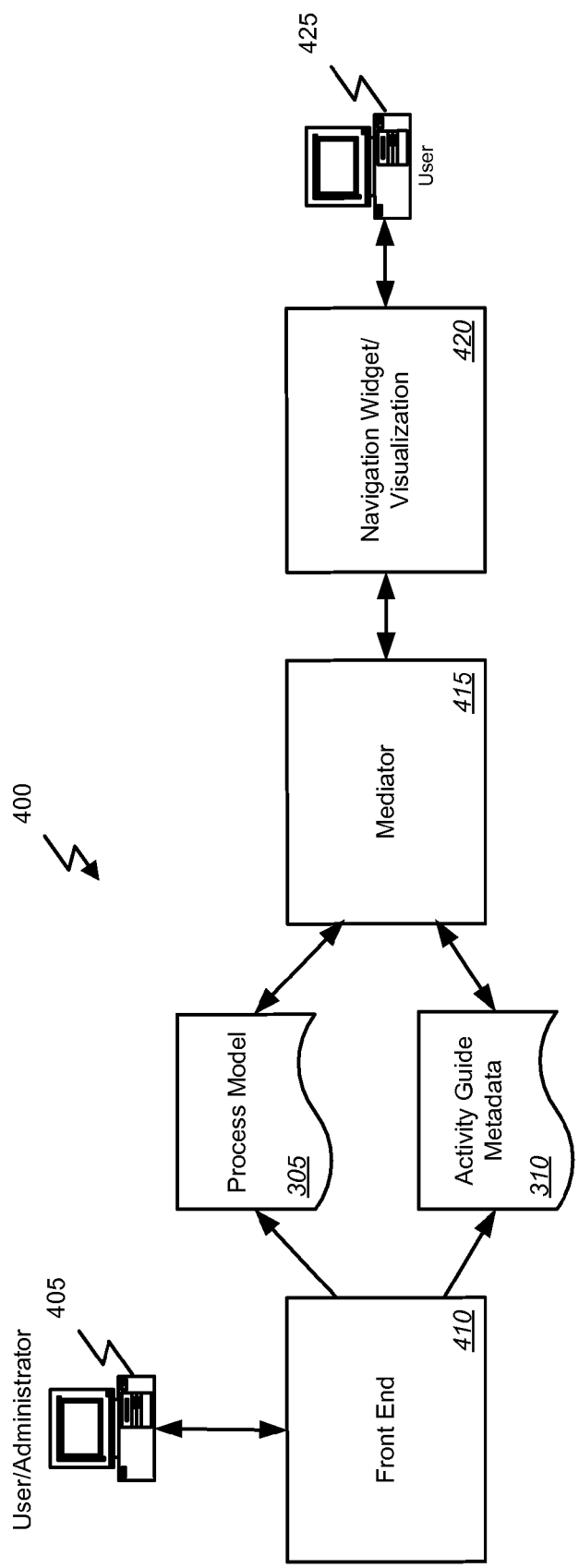
FIG. 4 is a block diagram illustrating components of an exemplary system for providing a user-relevant view of a business process according to one embodiment of the present invention.

FIG. 4 is a block diagram illustrating components of an exemplary system for providing a user-relevant view of a business process according to one embodiment of the present invention. In this example, the system 400 the system can comprise an administrator system 405 communicatively coupled with a front end 410. The administrator system 405 can be coupled with the front end 410 via a network such as the Internet or any other network such as described above.

Generally speaking, the front end 410 can provide a user interface for to the administrator system 405, for example via one or more web pages, through which a user of the administrator system 405 can define, modify, delete, and otherwise manage the process model 305 and activity guide metadata 310. More specifically, via the interface provided by the front end 410, a user of the administrator system 405 can define a process model 305 for a particular business process, e.g. "Employee On-boarding." The user of the administrator system 405 can also define the major activities in that business process, e.g.: "Establish IT Accounts," "Enroll in Health," "Dental," "Vision," "Get Office Equipment," etc. Activity Guide tasks can be identified for the process. For example, such tasks can include "Enroll in Health Care," "Select Health Plan," "Select Dental Plan," "Select Vision Plan," etc. These activity guide tasks can then be organized into the groupings of the activities into milestones/sub-milestones. For example, Enroll in Health, Vision and Dental could be grouped together with vision and dental enrollment in parallel milestones following basic health enrollment milestone.

Once the process model has been defined, the user of the administrator system 405, via the interface provided by the front end system 410, can specify metadata for: 1) the activity guide, 2) the milestone; and 3) the task and UI flow defined previously. According to one embodiment, the metadata can comprise, for example an eXtensible Markup Language (XML) file. Regardless of the exact format, the activity guide metadata file 310 can identify a set of one or more tasks within the process model 305 as described above. Additionally, the activity guide metadata 310 can define, for example, whether that set of tasks is ordered, i.e., must be completed before performing tasks of another milestone, or non-ordered, i.e., need not be completed before performing tasks of another milestone. The activity guide metadata 310 can also define, for example, sub-milestones for any given milestone. Furthermore, the sub-milestones may be defined as ordered or unordered. Following is an exemplary set of activity guide metadata according to one embodiment:

```
<activityGuide xmlns:xsi="http://www.w3.org/2001/XMLSchema-
instance"
        name="hr.ag.EmployeeOnboarding"
        displayName="Employee Onboarding Activity Guide"
        description="Employee Onboarding">
  <milestone name="hr.ag.ob.RequestITAcct"
        displayName="Request IT account"
        description="Request IT Account"
        icon="hr/ag/ob/request_it_acct.gif" mandatory="true"
        weight="1" manualCompleteAllowed="false"
        defaultErrorUI="hr.ag.DefaultMilestoneErrorRN"
        postCompleteAccessType="READ_ONLY">
    <nextActivity activityType="ASYNCH"
        processingUI="hr.ag.DefaultProcessingUIRegion"/>
  </milestone>
  < milestone name="hr.ag.ob.EnrollHealth"
        displayName="Enroll in Health Care"
        description="Enroll in Health Care"
        icon="hr/ag/ob/enroll_health.gif" mandatory="true"
        weight="1" manualCompleteAllowed="false"
        subTaskDisplayUI="hr.ag.ob.EnrollHealthSubtaskUI"
        defaultErrorUI="hr.ag.DefaultMilestoneErrorRN"
        postCompleteAccessType="READ_ONLY">
    <nextActivity/>
    <activityGuideTasks>
      <activityGuideTask name="hr.ag.ob.HealthPlan"
              displayName="Select Health Plan"
              description="Select Heatlh Plan"
              icon="hr/ag/ob/select_health.gif"
              mandatory="true" weight="1"
              manualCompleteAllowed="true"
              defaultErrorUI="hr.ag.DefaultMilestoneErrorRN"
              postCompleteAccessType="READ_ONLY">
              </ activityGuideTask >
      < activityGuideTask name="hr.ag.ob.DentalPlan"
              displayName="Select Dental Plan"
              description="Select Dental Plan"
              icon="hr/ag/ob/select_dental.gif"
              mandatory="true" weight="1"
              manualCompleteAllowed="false"
              defaultErrorUI="hr.ag.DefaultMilestoneErrorRN"
              postCompleteAccessType="READ_ONLY">
              </ activityGuideTask >
      < activityGuideTask name="hr.ag.ob.VisionPlan"
              displayName="Select Vision Plan"
              description="Select Vision Plan"
              icon="hr/ag/ob/select_vision.gif"
              mandatory="true" weight="1"
              manualCompleteAllowed="false"
              defaultErrorUI="hr.ag.DefaultMilestoneErrorRN"
              postCompleteAccessType="READ_ONLY">
              </ activityGuideTask >
    </ activityGuideTask >
  </milestone>
  <milestone name="hr.ag.ob.EquipOffice" displayName="Equip office"
        description="Equip Office"
        icon="hr/ag/ob/equip_office.gif" mandatory="true"
        weight="0.5" manualCompleteAllowed="false"
        defaultErrorUI="hr.ag.DefaultMilestoneErrorRN"
        postCompleteAccessType="READ_ONLY">
    <nextActivity/>
  </milestone>
</activityGuide>
```

In this example, "Name" can define a name for the activity guide process/milestone or task. "Display Name" can define a display name of activity guide process, milestone or task, i.e., the name to be displayed in the visualization rendering. "Description" can define a description of activity guide process, display name or task. "Icon" can define an icon associated with milestone/task to be displayed in the visualization rendering. "Mandatory" can define whether a task is mandatory for completion of activity guide. "ManualCompleteAllowed" can define whether manual completion is allowed for this milestone or task. "Default error UI" can define a specific error panel to display for a given milestone. "Post Complete Access Type" can define activity guide behavior after the completion of the milestone. "Weight" can define the milestone weight for the purposes of calculating the completion of process, for example by the formula: % Milestone Complete=Sum (weight×completed task within milestone) *100/total tasks in milestone. In such a case, weight can be a decimal number with value between 0 and 1. Total weight of all serial tasks (set of tasks) can thus add to 1. According to one embodiment, parallel tasks can have the same weight. "Next Activity" can define a type of next activity if not a milestone, and default User Interface (UI) to show for it while it is being processed.

The system 400 can also include a runtime mediator 415. Generally speaking, the runtime mediator 415 can read the process model and the activity guide metadata 310 and create the visualization of the business process based on the process model 305 and activity guide metadata 310. More specifically, the runtime mediator can comprise a combination of sender initiated push and receiver interest based pull protocols along with a metadata interpreter to facilitate bi-directional communication between the process model and the end user interface illustrated here as the navigation widget or visualization 420. Thus, the runtime mediator 415 can comprise a listener to the process model which refreshes the visualization 420 with current status of the flow, and details of the next task as well as a listener to UI actions to control/manage the process flow to the extent allowed by the UI, and display of selected tasks.

Stated another way, via the runtime mediator 415, the system 400 can generate the visualization of the business process, i.e., the visualization 420, that can then be rendered, for example via a web browser on a user system 425. After rendering, an input can be received from the user system 425 indicating a status for the milestone. A status of the process model 305 can be updated via the runtime mediator 415 based on the status for the milestone. Furthermore, the visualization of the business process, i.e., the visualization 420 can be updated by the runtime mediator based on the status for the milestone and the visualization of the business process can be re-rendered.

It should be understood that the system 400 described here is offered by example for illustrative purposes only. In other implementations various other different, more, or fewer components may be used to perform the same functions. For example, while shown here as separate systems, the administrator system 405 and the user system 425 may in fact be the same device. Additionally or alternatively, the various other elements such as the process model 305, activity guide 310, mediator, and visualization 420 can be maintained by and reside on the administrator system 405, user system 425, or another system not illustrated her. Similarly, it should be understood that the exemplary activity guide metadata described above is also offered by way of example only. In other implementations more, fewer, or different items may defined in any of a variety of formats.

Figure 5:
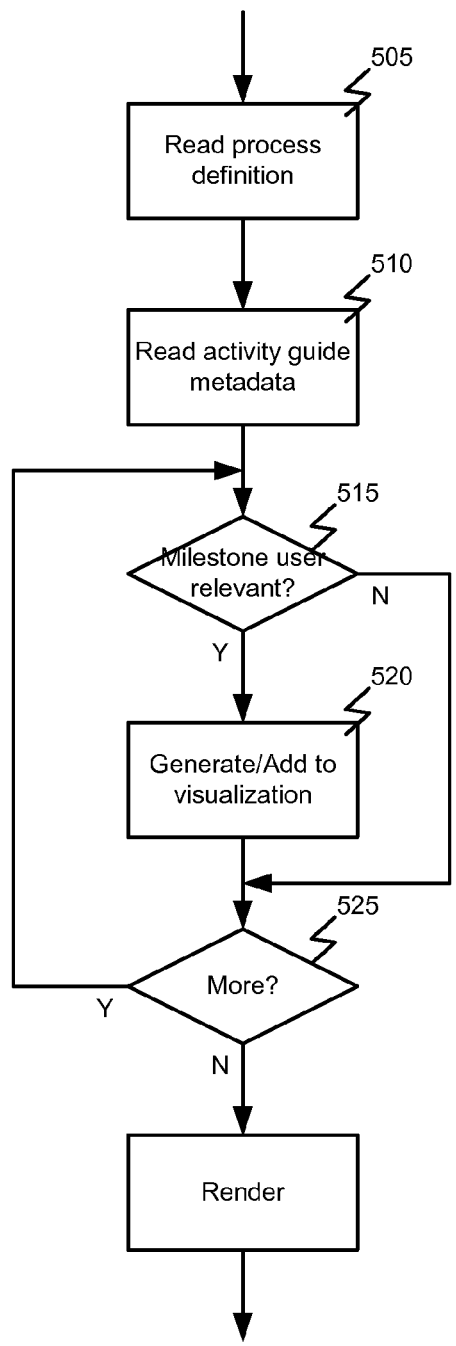
FIG. 5 is a flowchart illustrating a process for providing a user-relevant view of a business process according to one embodiment of the present invention.

FIG. 5 is a flowchart illustrating a process for providing a user-relevant view of a business process according to one embodiment of the present invention. This example illustrates a process which may be performed, for example, by a runtime mediator as described above to provide the visualization of the business process based on the process model and the activity guide metadata. In this example, the process begins with reading 505 a definition of the business process. The activity guide metadata, containing the set of predefined milestones as described above, can also be read 510.

A determination 515 can be made as to whether a milestone in the business process is relevant to an end user of the business process based on the set of pre-defined milestones for the business process. In response to determining 515 the milestone in the business process is relevant to the end user a visualization of the business process, such as a web page for example, can be generated 520 that includes the milestone. In response to determining 515 the milestone in the business process is not relevant to the end user, a visualization of the business process can be generated 520 that does not include the milestone.

A determination 525 can then be made as to whether more of the process model is to be mapped. For example, a determination 525 can be made as to an end of file or other marker in the process model has been reached. If 525 more of the process model remains to be mapped, processing returns to determining 515 whether a milestone in the business process is relevant to an end user of the business process and generating 520 the visualization based on that determination 515. As noted above, each milestone may include one or more sub-milestones. Thus, determining 515 whether a milestone in the business process is relevant to an end user of the business process and generating 520 the visualization based on that determination 515 can continue for all milestones and sub-milestones. Once a determination 525 is made that no more of the process model remains to be mapped, the visualization of the business process can then be rendered 520.

Figure 6:
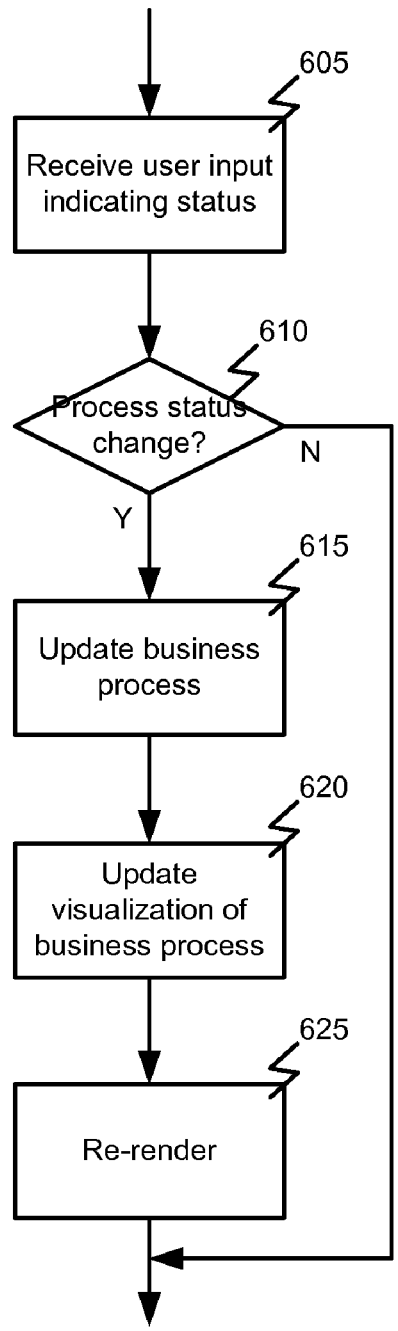
FIG. 6 is a flowchart illustrating a process for updating a status of a business process according to one embodiment of the present invention.

FIG. 6 is a flowchart illustrating a process for updating a status of a business process according to one embodiment of the present invention. This example illustrates a process which may be performed, for example, by a runtime mediator as described above to provide for updating the process model and visualization thereof based on a user input. In this example, processing begins with receiving 605 an input from the end-user indicating a status for a step or milestone of the process model. A determination 610 can be made as to whether this input represents a change in the status of the milestone. If a determination 610 is made that the input represents a change in status, a status of the business process can be updated 615 based on the status for the milestone. Furthermore, the visualization of the business process can be updated 620 based on the status for the milestone and the visualization of the business process can be re-rendered 625.

Figure 7:
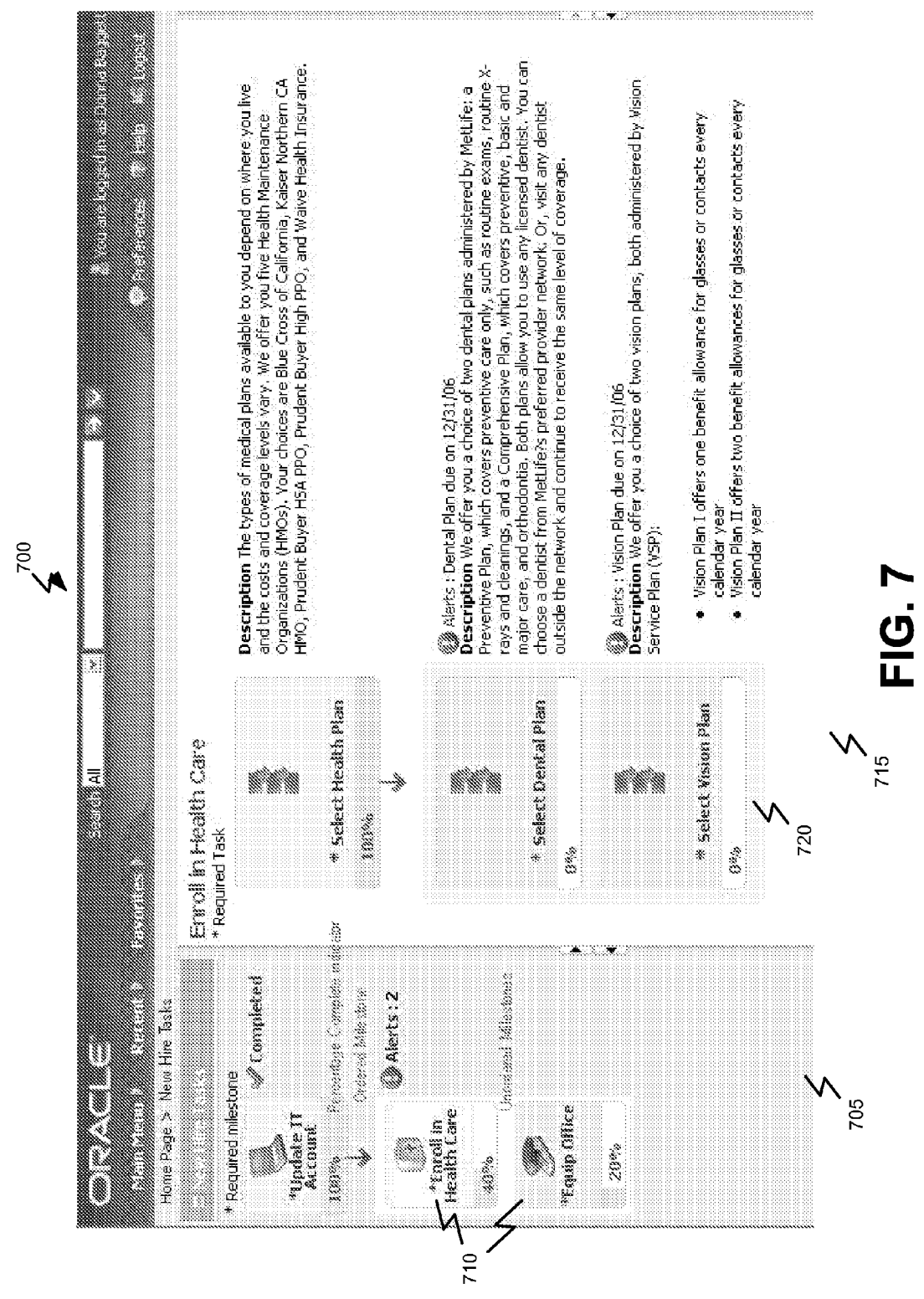

FIG. 7 is a screenshot of an exemplary user interface for displaying a user-relevant view of a business process including milestones and sub-milestones according to one embodiment of the present invention. As illustrated here, the graphical user interface for business processes involving human tasks can comprise a web page 700. On the left side or left frame 705 of the page can be a sequence of milestones 710. As noted above, milestones can be graphical representations of collections of tasks from the business process model. Milestones can be mapped to one or more "sub-milestones" 720 that can be displayed in the center area 715 of the web page 700. Milestones can also display the percent complete as a bar at the bottom of the milestone and checkmark displays the right of the milestone when the milestone achieves 100% completion rate. Sub-milestones can have the same percent complete indicator and the same checkmark indication of 100% complete. So, as users progress through the milestones and their associated sub-milestones, completion of milestones indicates that the "business process activity" has been completed. Milestones can also display alerts, which can be displayed as items in a alert dialog. Alerts can be used to inform users of impending deadlines and other "real-time" information related to tasks in the sub-milestones.

Figure 8:
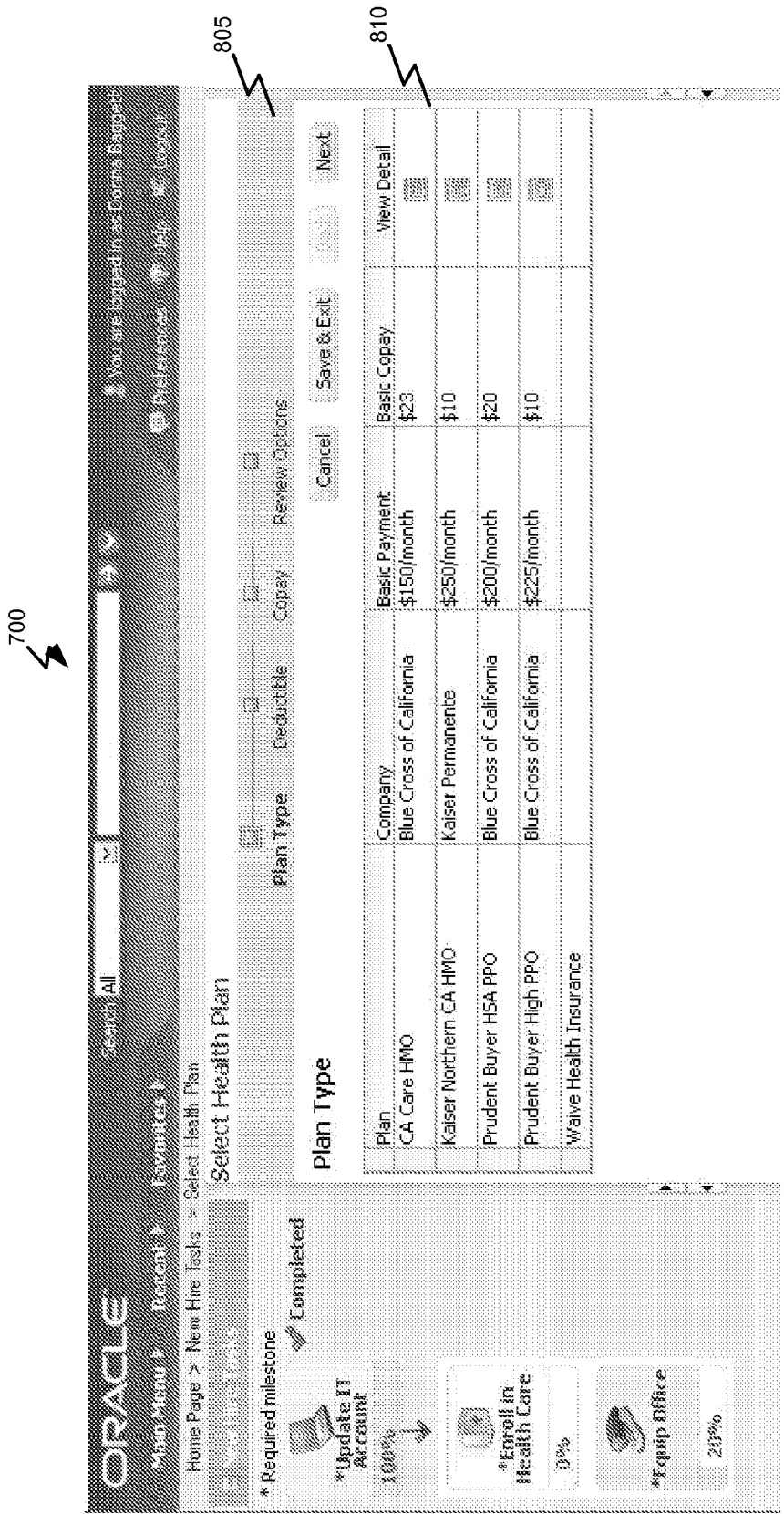
FIG. 8 is a screenshot of an exemplary user interface for displaying contents of a sub-milestone according to one embodiment of the present invention.

FIG. 8 is a screenshot of an exemplary user interface for displaying contents of a sub-milestone according to one embodiment of the present invention. This example illustrates the web page 700 introduced above after a sub-milestone, in this case the "Select Health Plan" sub-milestone has been selected. As noted above, the sub-milestones can be linked to a collection of ordered tasks represented in a linear arrangement 805. In other words, the series of ordered tasks, e.g., "Plan Type," "Deductible," "Copay," and "Review Options" in this example, can be displayed in an ordered series of elements such as boxes, buttons, or other elements in which the current subtask may be highlighted. Additionally, detailed information 810 related to the current subtask may also be displayed.

Figure 9:
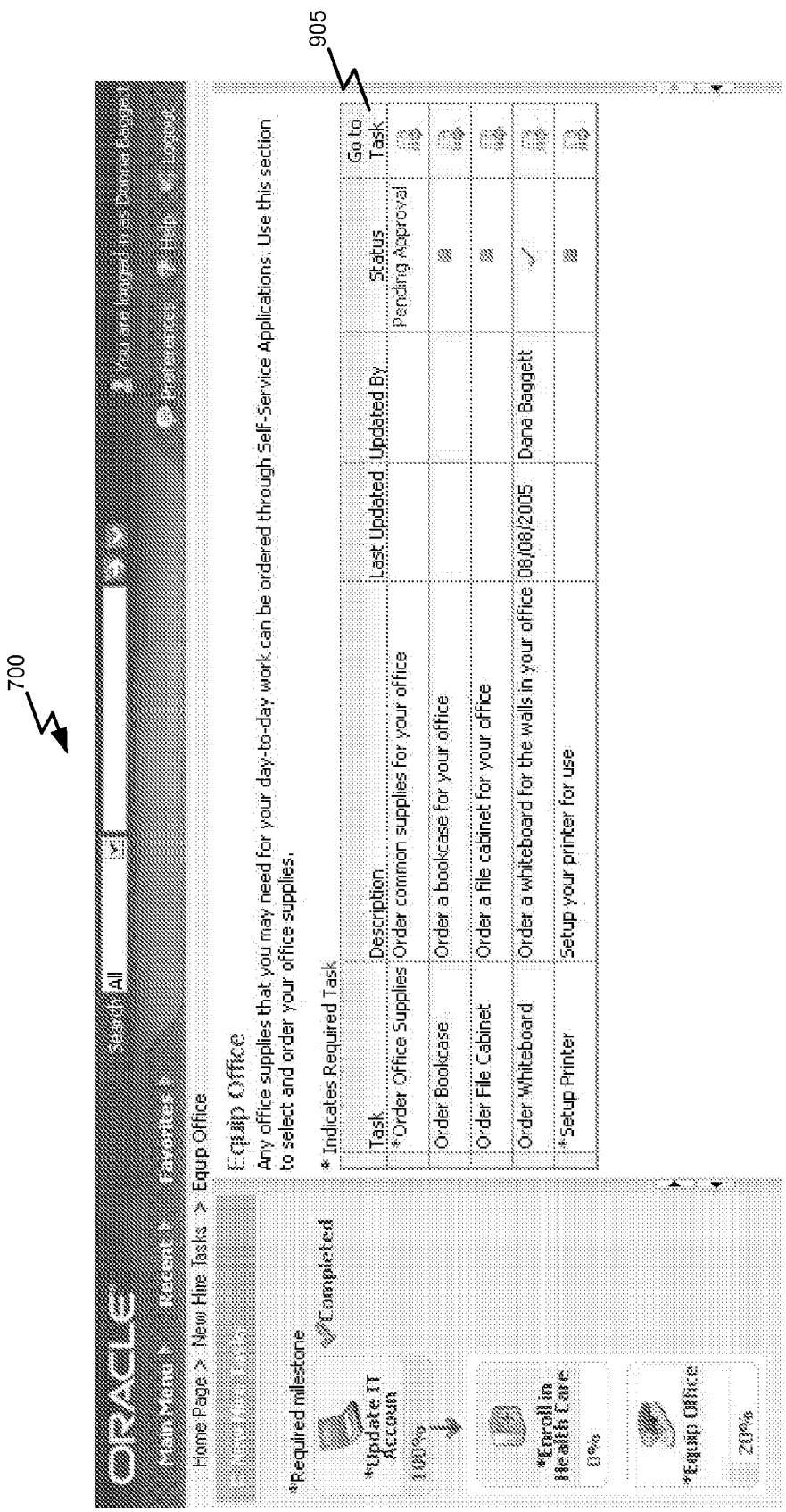
FIG. 9 is a screenshot of an exemplary user interface for displaying contents of a sub-milestone according to another embodiment of the present invention.

FIG. 9 is a screenshot of an exemplary user interface for displaying contents of a sub-milestone according to another embodiment of the present invention. This example illustrates the web page 700 introduced above after a sub-milestone, in this case the "Equip Office" sub-milestone has been selected. As noted above, the sub-milestones can be linked to a collection of non-ordered tasks represented as a "Checklist" user interface 905. In other words, the set of non-ordered tasks, e.g., "Order Office Supplies," "Order Bookcase," "Order File Cabinet," etc in this example, can be displayed in a list of elements. Additionally, detailed information related to each subtask such as a description, last update, status, etc. may also be displayed.

Figure 10:
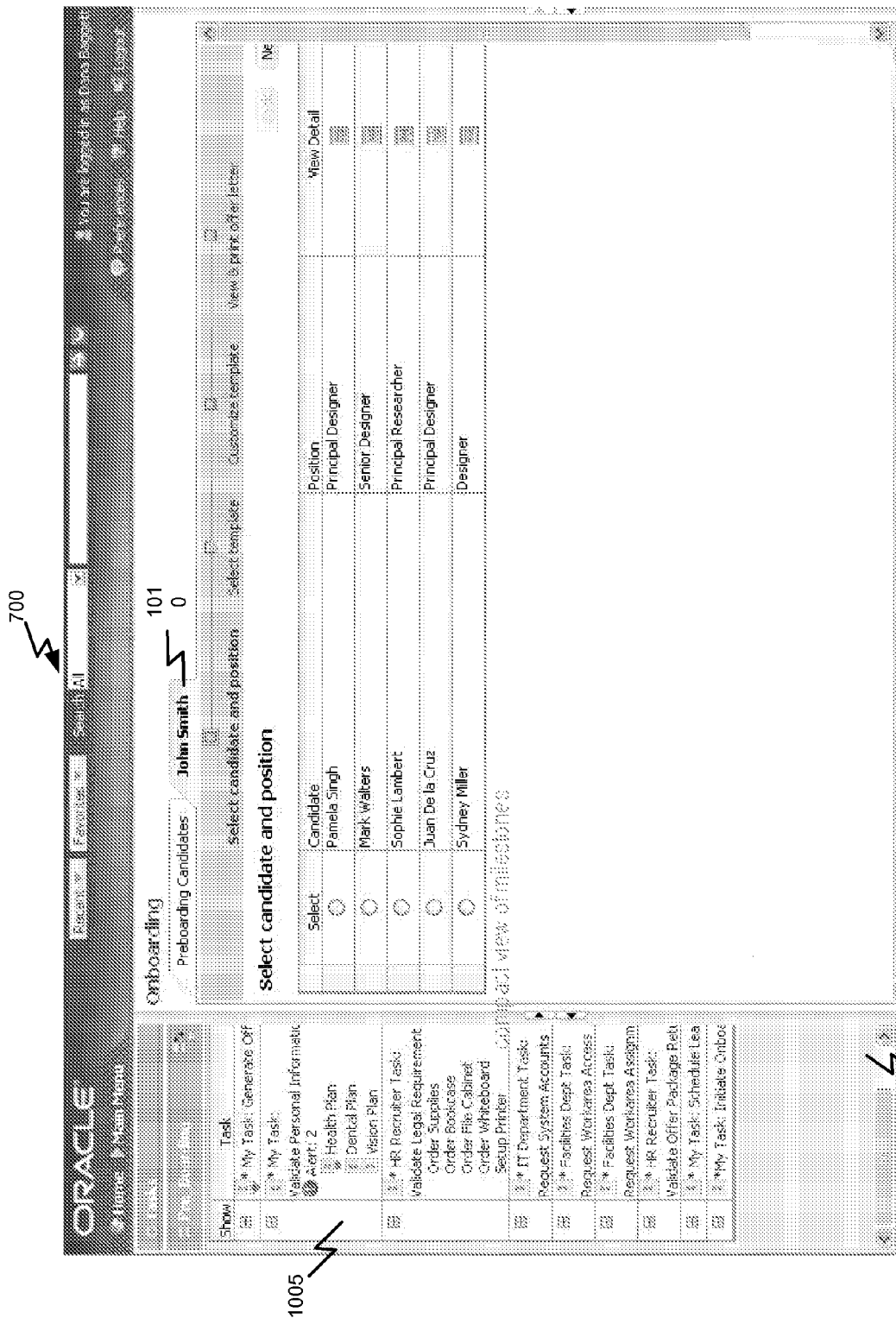
FIG. 10 is a screenshot of an exemplary user interface for displaying collaborative business process activity according to one embodiment of the present invention.

FIG. 10 is a screenshot of an exemplary user interface for displaying collaborative business process activity according to one embodiment of the present invention. Milestones and sub-milestones can also have "compact" views that displays as a graphical tree 1005 on the left side or frame 705 of the web page 700 where the Milestones are displayed in a table with the Sub-Milestones displayed nested under the Milestones. The percent complete in the "compact" view can be displayed in the tool-tip as text. The "full" view and "compact view" can be "toggled" by the user by selecting an icon.

Milestones displayed in the left hand side or frame 705 can have an "owner" assigned to the milestone, as indicated here by the tab 1010 with the owner's name. The owner of the milestone may be a different user than the owner of the activity. The owner of the milestone can be displayed at the bottom of the milestone in the milestone view and appended to the milestone name in the "compact" view. The activity owner can select milestones displayed with an "owner" different from the activity owner user. In this case, the sub-milestone tasks can be displayed in a "read-only" mode. In addition the viewer of the milestone (i.e., the activity owner) can communicate to the milestone owner by sending a text message, email to the milestone owner or initiating a real-time chat or voice over IP (VOIP).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing a user-relevant view of a business process, the method comprising:
   reading, by a computer system, a process model for the business process and defining activities in the business process;
   reading, by the computer system, an activity guide for an end user and related to the business process, the activity guide comprising a metadata file comprising pre-defined metadata;
   identifying and defining one or more sets of the activities and milestones defined in the process model and pre-defined metadata;
   identifying one or more sets of activities in the process model as involving the end user, wherein each milestone is identified in the activity guide and comprises a collection of one or more of the activities of the business process associated with the milestone and involving the end user;
   determining, by the computing system, based on the milestones one or more ordered milestones, wherein the one or more ordered milestones are pre-defined as ordered by metadata of the activity guide, wherein the one or more ordered milestones require completion of one or more activities in the process model associated with the milestone by the metadata of the activity guide prior to performing one or more activities in the process model associated with a subsequent milestone by the metadata of the activity guide;
   determining, by the computing system, based on the milestones one or more non-ordered milestones, wherein the one or more non-ordered milestones are pre-defined as non-ordered by metadata of the activity guide, and wherein the one or more non-ordered milestones do not require completion of one or more activities in the process model associated with the milestone by the metadata of the activity guide prior to performing one or more activities in the process model associated with a subsequent milestone by the metadata of the activity guide;
   determining, by the computer system, whether one of the milestones in the business process involves the end user of the business process based on the process model and the metadata of the activity guide;
   in response to determining the milestone in the business process does involve the end user, generating a visualization of the business process that includes the milestone; and
   in response to determining the milestone in the business process does not involve the end user, generating a visualization of the business process that does not include the milestone.

2. The method of claim 1, further comprising rendering by the computer system the visualization of the business process.

3. The method of claim 2, further comprising:
   receiving by the computer system input from the end-user indicating a status for the milestone; and
   updating by the computer system a status of the business process in the activity guide based on the status for the milestone.

4. The method of claim 3, further comprising:
   updating the visualization of the business process based on the status for the milestone; and
   re-rendering the visualization of the business process.

5. The method of claim 1, wherein generating the visualization of the business process comprises generating a visualization of the ordered milestones in a linear arrangement.

6. The method of claim 1, wherein at least one of the milestones comprises one or more sub-milestones wherein each sub-milestone is pre-defined in the metadata of the activity guide and comprises a collection of one or more activities of the process model associated with the sub-milestone by the metadata of the activity guide.

7. The method of claim 6, wherein the one or more sub-milestones comprise one or more ordered sub-milestones, wherein the one or more ordered sub-milestones are pre-defined as ordered by metadata of the activity guide, and wherein the one or more ordered sub-milestones require completion of one or more activities in the process model associated with the sub-milestone by the metadata of the activity guide prior to performing one or more activities in the process model associated with a subsequent sub-milestone by the metadata of the activity guide.

8. The method of claim 7, wherein the one or more sub-milestones comprise one or more non-ordered sub-milestones, wherein the one or more non-ordered milestones are pre-defined as non-ordered by metadata of the activity guide, and wherein the one or more non-ordered sub-milestones do not require completion of one or more activities in the process model associated with the sub-milestone by the metadata of the activity guide prior to performing one or more activities in the process model associated with a subsequent sub-milestone by the metadata of the activity guide.

9. The method of claim 1, wherein the definition of the business process comprises a Business Process Execution Language (BPEL) definition.

10. A machine-readable memory having stored thereon a series of instructions which, when executed by a processor, cause the processor to provide a user-relevant view of a business process by:
    reading a process model for the business process and defining activities in the business process;
    reading by the computer system an activity guide for an end user and related to the business process, the activity guide comprising a metadata file comprising pre-defined metadata;
    identifying and defining one or more sets of the activities and milestones defined in the process model and pre-defined metadata;
    identifying one or more sets of activities in the process model as involving to the end user, wherein each milestone is identified in the activity guide and comprises a collection of one or more of the activities of the business process associated with the milestone and involving to the end user;
    determining based on the milestones one or more ordered milestones, wherein the one or more ordered milestones are pre-defined as ordered by metadata of the activity guide, wherein the one or more ordered milestones require completion of one or more activities in the process model associated with the milestone by the metadata of the activity guide prior to performing one or more activities in the process model associated with a subsequent milestone by the metadata of the activity guide;

determining based on the milestones one or more non-ordered milestones, wherein the one or more non-ordered milestones are pre-defined as non-ordered by metadata of the activity guide, and wherein the one or more non-ordered milestones do not require completion of one or more activities in the process model associated with the milestone by the metadata of the activity guide prior to performing one or more activities in the process model associated with a subsequent milestone by the metadata of the activity guide;

determining whether one of the milestones in the business process involves the end user of the business process based on the process model and the metadata of the activity guide;

in response to determining the milestone in the business process does involve the end user, generating a visualization of the business process that includes the milestone; and in response to determining the milestone in the business process does not involve the end user, generating a visualization of the business process that does not include the milestone.

11. The machine-readable memory of claim 10, further comprising rendering the visualization of the business process.

12. The machine-readable memory of claim 11, further comprising:

receiving input from the end-user indicating a status for the milestone; and updating a status of the business process based on the status for the milestone.

13. The machine-readable memory of claim 12, further comprising:

updating the visualization of the business process based on the status for the milestone; and re-rendering the visualization of the business process.

14. The machine-readable memory of claim 10, wherein at least one of the milestones comprises one or more sub-milestones wherein each sub-milestone is pre-defined in the metadata of the activity guide and comprises a collection of one or more activities of the process model associated with the sub-milestone by the metadata of the activity guide.

15. A system comprising:

a processor; and a memory communicatively coupled with and readable by the processor, the memory having stored therein a business process, a process model for the business process and defining activities in the business process and a plurality of activity guides, each activity guide comprising a metadata file comprising pre-defined metadata, a series of instructions which, when executed by the processor, cause the processor to:

read the definition of the business process, identify and define one or more sets of the activities and milestones defined in the process model and pre-defined metadata, identify one or more sets of activities in the process model as involving to an end user of a plurality of end users, wherein each milestone is identified in the activity guide and comprises a collection of one or more activities of the business process associated with the milestone and involving to the end user, determine based on the milestones one or more ordered milestones, wherein the one or more ordered milestones are pre-defined as ordered by metadata of the activity guide, and wherein the one or more ordered milestones require completion of one or more activities in the process model associated with the milestone by the metadata of the activity guide prior to performing one or more activities in the process model associated with a subsequent milestone by the metadata of the activity guide, determine based on the milestones one or more non-ordered milestones, wherein the one or more non-ordered milestones are pre-defined as non-ordered by metadata of the activity guide, and wherein the one or more non-ordered milestones do not require completion of one or more activities in the process model associated with the milestone by the metadata of the activity guide prior to performing one or more activities in the process model associated with a subsequent milestone by the metadata of the activity guide, determine whether one of the milestones in the business process involves an end user of the plurality of end users of the business process based on the process model and the metadata of the activity guide for the end user, in response to determining the milestone in the business process involves the end user, generate a visualization of the business process that includes the milestone, and in response to determining the milestone in the business process does not involve the end user, generate a visualization of the business process that does not include the milestone.

16. The system of claim 15, further comprising an output device communicatively coupled with the processor, wherein the instruction further cause the processor to render the visualization of the business process on the output device.

* * * * *

UNITED STATES PATENT AND TRADEMARK OFFICE
CERTIFICATE OF CORRECTION

PATENT NO. : 8,296,171 B2  
APPLICATION NO. : 11/851456  
DATED : October 23, 2012  
INVENTOR(S) : Shurtleff et al.

Page 1 of 1

It is certified that error appears in the above-identified patent and that said Letters Patent is hereby corrected as shown below:

In column 2, line 61, delete "alternatively. the" and insert -- alternatively, the --, therefor.

In column 7, line 1, delete "(e.g." and insert -- (e.g., --, therefor.

In column 11, line 46, delete "milestone," and insert -- milestone. --, therefor.

Signed and Sealed this
Twenty-fifth Day of December, 2012

David J. Kappos
*Director of the United States Patent and Trademark Office*